346

United States Patent Office 2,744,086
Patented May 1, 1956

2,744,086

DYEABLE ACRYLONITRILE FIBER FORMING COMPOSITIONS

David T. Mowry and Alfred B. Craig, Dayton, Ohio, assignors, by mesne assignments, to The Chemstrand Corporation, a corporation of Delaware No Drawing. Application November 26, 1949, Serial No. 129,688

7 Claims. (Cl. 260—45.4)

This invention relates to new and valuable fiber forming compositions. More specifically the invention relates to acrylonitrile polymers capable of being dyed by conventional procedures, especially with acid type dyestuffs.

It is well known that polyacrylonitrile and copolymers of acrylonitrile and other mono-olefinic polymerizable monomers are excellent fiber forming copolymers. The polyacrylonitrile and copolymers of more than 75 percent acrylonitrile and up to 25 percent of monomers, such as vinyl acetate and other vinyl esters of monocarboxylic acid, methyl methacrylate and other alkyl esters of methacrylic or acrylic acids, styrene and other vinyl substituted hydrocarbons, vinylidene chloride, and methacrylonitrile produce fibers with superior tensile properties, desirable elongation, and excellent stability under a wide range of physical and chemical conditions. These polymers and the fibers produced therefrom are subject to inherent disabilities which greatly restrict their utility as general purpose fibers. For example, the fibers do not have sufficient dye affinity to enable the development of satisfactory colored fibers, and the limited range of colors developed by conventional dyeing techniques are not stable to laundering and dry-cleaning procedures.

The purpose of this invention is to provide a new and valuable general purpose fiber. A further purpose of the invention is to provide fiber forming acrylonitrile polymers which are dye receptive by conventional procedures. A still further purpose of the invention is to provide a convenient means for modifying non-dye receptive acrylonitrile polymers and converting them into polymers with complete dye affinity without depreciating the physical properties of fibers prepared therefrom.

It has been found that normally non-dye receptive acrylonitrile polymers and copolymers may be rendered useful for the purpose of preparing general purpose dyeable fibers by incorporating them with linear polyesters containing either tertiary amino groups or quaternary ammonium radicals. The quantity of polyester required to achieve a successful result in the practice of this invention will depend to some extent upon the number of tertiary amino groups or quaternary ammonium radicals present in the polymer. In general from two to 30 percent of the said polyester will be effective, but preferred compositions are those utilizing from five to 20 percent of the nitrogen containing polyesters.

The polyesters in general are prepared by the condensation of proper stoichiometric proportions of selected difunctional compounds containing carboxy and hydroxyl groups. By carboxy group is meant a carboxylic acid group or a group derived from a carboxylic acid, such as an ester, an acid chloride, or another derivative which will react with a hydroxyl group under the conditions present in the condensation reaction medium. Suitable difunctional compounds are the dicarboxylic acids, the glycols, and the monohydroxy monocarboxylic acids, or reactive derivatives of these three types of difunctional compounds. A critical characteristic of the polyesters which are useful in the practice of this invention is the presence of tertiary amino groups or quaternary ammonium radicals in one or more of the components used in the preparation of the polyesters.

In the preparation of the polyesters, glycols may be condensed with dicarboxylic acids, but equimolecular proportions should be used so as to encourage the formation of high molecular weight polyesters. The preparation of polyesters from equal moles of glycols and dicarboxylic acids may also have present any proportion of a monohydroxymonocarboxylic acid. The proportions of the hydroxy acid are not material since whatever proportion used will not vary the stoichiometric proportions of hydroxyl and carboxy groups. A monohydroxymonocarboxylic acid containing the desirable tertiary amino or quaternary ammonium radicals may be condensed with the dicarboxylic acid and glycol to form similarly useable polyesters.

Useful polyesters may be prepared from aliphatic dicarboxy compounds containing one or more tertiary amino or quaternary ammonium groups in the chain between the carboxy groups. Thus, the aliphatic dicarboxylic acids may be represented by the following structural formula:

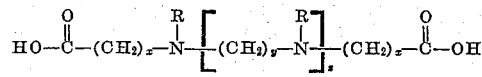

wherein $x$, $y$ and $z$ are small whole numbers, and R is an alkyl, aralkyl or cycloalkyl radical. Preferred compounds are those wherein $z$ is zero to one inclusive and $x$ and $y$ are one to two inclusive.

Dicarboxylic acids of this type may be prepared by reacting two moles of an acrylic acid derivative with one mole of a primary amine, or by reacting a halogen substituted carboxylic acid derivative with a half molecular equivalent of a primary amine. Thus, methyl acrylate may be reacted with n-butyl amine to form the dimethyl ester of N-butyl-4-azapimelic acid. Similarly, two moles of methyl chloroacetate may be reacted with ethyl amine to form the ethyl ester of N-ethyl-3-azaglutaric acid. Other derivatives may readily be prepared by substituting different primary amines and different esters of either halogen substituted carboxylic acids or unsaturated acids.

Dicarboxylic acids and their derivatives of this type having a plurality of nitrogen atoms may be prepared similarly using di-secondary amines, such as N,N'-dimethylethylenediamine or homologues thereof, and reacting them with methyl acrylate, methyl chloroacetic acid or homologues thereof.

Another useful class of dicarboxy compounds are those of which the acids have the structural formula:

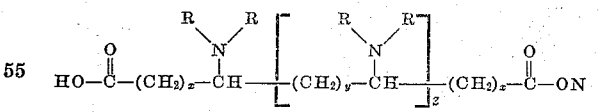

wherein $x$, $y$ and $z$ are small whole numbers, and R is alkyl, aralkyl or cycloalkyl radicals. A preferred class of these dicarboxylic acids are those in which $x$ is a whole number from one to two, inclusive, $y$ is a whole number from two to six, inclusive, and $z$ is a whole number from zero to one, inclusive.

These acids may be prepared by reacting a secondary amine, such as dimethylamine, dibenzylamine or cyclohexylamine or homologues thereof, with an aliphatic dicarboxylic acid containing an unsaturated group or a halogen substituent. Thus, dimethyl maleate may be reacted with dimethylamine, or the diethyl ester of chlorosuccinic acid may be reacted with dibenzylamine. By using derivatives of various unsaturated or halogen substituted aliphatic dicarboxylic acids and various diamines of the type described many different dicarboxylic acids having tertiary amine groups in the side chain may be prepared for use in the practice of this invention. Other useful dicarboxy compounds such as esters and acid chlorides may be prepared from the carboxylic acids by conventional methods.

Another useful type of dicarboxy compound for the preparation of valuable polyesters are those in which the tertiary nitrogen atom is in a heterocyclic ring to which is attached the carboxy containing substituents. The acids of this type may be represented by the structural formula:

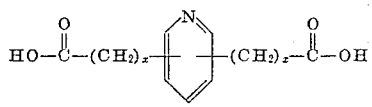

wherein $x$ is a small whole number from zero to three, inclusive. Thus, quinolinic acid or other pyridine dicarboxylic acids are useful as are the pyridine diacetic acid derivatives and the pyridine diacids derived from other carboxylic acids. In place of the pyridine ring other N-heterocyclic rings may be used.

Another useful type of dicarboxy compound for the preparation of the polyesters is the aromatic acid containing the tertiary amino group on a side chain. Thus, phthalic acid may contain an aliphatic substituent on the ring containing a tertiary amino grouping. These may also be used in the practice of this invention.

All of the above described dicarboxylic acids containing reactive tertiary amino groups may be converted into quaternary ammonium compounds which are also useful in the practice of this invention. This conversion is effected by reaction with a halogen containing organic compound, for example alkyl, aralkyl and cycloalkyl halides, haloalkyl esters of monocarboxylic acids, alkyl esters of halo-substituted carboxylic acids, halogen substituted dialkyl ethers, and halogen substituted dialkyl ketones. Suitable halides for use in the practice of this invention are ethyl chloride, n-butyl bromide, amyl chloride, n-octyl bromide, methyl chloracetate, 2-chloroethyl acetate, cyclohexyl chloride, benzyl bromide, methyl chloroethyl ether, chloromethyl ethyl ketone, lauryl iodide, and octadecyl chloride. Because of the difficulty of effecting reactions with gases or very volatile liquids it is desirable to use the aliphatic halides of intermediate scope having from four to eight carbon atoms.

The various dibasic acids (or derivatives thereof), described above may be condensed with any dihydroxy compound. Suitable dihydroxy compounds are the aliphatic glycols, such as ethylene glycol, 1,2-propylene glycol, trimethylene glycol, tetramethylene glycol, the various other butylene glycols, the polyethylene glycols, such as, diethylene glycol, triethylene glycol, and other oxaglycols and the analogous thioglycols having divalent sulfur atoms in place of the ether oxygen atoms, hexamethylene glycol, decamethylene glycol and analogous compounds containing an aliphatic hydrocarbon, a thiohydrocarbon or an oxahydrocarbon radical between the hydroxyl groups. Other glycols which may be used are those containing aromatic nuclei in the otherwise aliphatic chains, for example the various di-(hydroxyalkyl) benzenes and the analogous compounds having other divalent aromatic nuclei in the chain between the hydroxyl groups.

Other polyesters which are useful for blending with non-dyeable acrylonitrile resins to develop dyestuff affinity are the polyesters which have their functional tertiary amino or quaternary ammonium radical in the glycol nucleus. Several types of these glycols are known. The most important types are the N-substituted aza glycols which have the following structure:

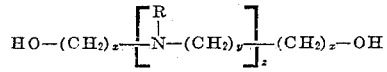

wherein $x$, $y$ and $z$ are small whole numbers, and R is an alkyl, a cycloalkyl or an aralkyl radical. In the preferred glycols of this type the R radical will have a maximum of eight carbon atoms, $x$ will be from 2 to 3, inclusive, $y$ from 2 to 6, inclusive and $z$ from zero to one inclusive.

These azaglycols are prepared by reacting two moles of ethylene oxide or ethylene chlorohydrin or other suitable olefin oxide or chlorohydrin with primary amines in which the organic radical is that corresponding to the R group in the compound to be prepared. The azaglycols having a plurality of tertiary amino radicals may be prepared from di-secondary amines, for example the N,N'-dimethylethylenediamine, or homologues thereof.

Other types of glycols containing tertiary amino groups are those in which the tertiary amino group is present in a side chain and is not an atom in the continuous chain between the hydroxyl groups. These glycols may be represented by the following structural formula:

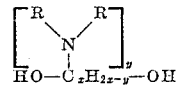

in which $x$ is the number of carbon atoms in the aliphatic hydrocarbon position of the molceule to which two hydroxyls and any number of tertiary amino radicals are attached, $y$ is the number of tertiary amino substituents in the compound, and R is an alkyl, aralkyl or cycloalkyl radical.

These glycols may be prepared by reacting secondary amines having substituents corresponding to the desired R group with aliphatic glycols containing halogen substituents or unsaturated double bonds in the structure.

The invention may also be practiced with other types of glycols, for example those in which the tertiary amino group is substituted on an aromatic radical or in which the tertiary alkyl group is present in a heterocyclic ring. Furthermore, these glycols, as well as the glycols described in the preceding paragraphs, may be reacted with halogen containing organic compounds, such as alkyl, aralkyl or cycloalkyl halides, halogen substituted ethers, halo-alkyl esters of carboxylic acids, or alkyl esters of halo-substituted carboxylic acids, to form quaternary salts. The glycols containing quaternary ammonium salt radicals are also useful for the preparation of ploymers capable of improving the dye receptivity of normally known dyeable acrylonitrile polymers.

The functional glycols may be reacted with any dicarboxylic acid, or an ester, acid chloride and salt thereof. Thus, derivatives of the following acids may be used effectively; succinic acid, adipic acid, suberic acid, sebasic acid, and other acids containing divalent aliphatic hydrocarbon radicals between the carboxy groups, the various aromatic dicarboxylic acids, such as o-phthalic acid, isophthalic acid, terephthalic acid, diphenylene dicarboxylic acid, napthalene dicarboxylic acids and other acids having an aromatic nucleus and two carboxy substituents. The other mixed aromatic aliphatic acids may similarly be used, for example carboxymethylbenzoic acid, phenyl substituted succinic acid and other dicarboxylic acids having araliphatic radicals with the carboxy groups substituted on either the aromatic or aliphatic position of the araliphatic radical.

If desired the polyesters may have the functional tertiary amino or quaternary ammonium radical in both the dicarboxylic acid or the glycol. Such polyesters will be more effective in inducing the dye receptivity to the acrylonitrile polymer in the practice of this invention.

Other types of polyesters useful in the practice of this invention are those prepared from hydroxy acids containing tertiary amino or quarternary ammonium radicals. These useful difunctional compounds may have the critical nitrogen group in the carbon chain between the hydroxyl and carboxy groups or it may be in an independent side chain. The tertiary amino or quaternary ammonium radical may be aliphatic in nature or it may be part of an alkyl substituent on an aromatic nucleus. Similarly, the functional nitrogen group may be part of a heterocyclic ring substituted in or on the chain between the hydroxyl and carboxy radicals. Suitable types of these hydroxy acids are those set forth by the following structural formula:

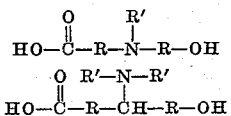

wherein the R radicals are divalent hydrocarbon radicals and the R' radicals are monovalent hydrocarbon radicals. These functional hydroxy acids or derivatives thereof may be prepared from esters of amino acids containing secondary amino groups by reaction with ethylene oxide or some other alkylene oxide to introduce a hydroxy alkyl radical.

The polyesters prepared from hydroxy acids may be prepared from one or more of the amino containing hydroxy acids which may contain any proportion of other other hydroxy acids not containing the critical nitrogen groups. Suitable hydroxy acids of this type are glycolic acid, lactic acid, and other aliphatic or aromatic acids containing a single hydroxyl and a single carboxy substitutent. In addition the amino containing hydroxy acid may be condensed with any proportion of an equimolar mixture of dicarboxylic acids and glycols. In this modification of the invention either, both or neither of the dicarboxylic acid and glycol may have the functional tertiary amino or quaternary ammonium radicals. However, if the hydroxy acid does not contain the critical amino groups then either the glycol or the dibasic acid must contain them in order to make the polyesters operative in the practice of this invention.

The polyesters prepared in accordance with this invention are prepared by conventional methods involving heating the glycol with the dibasic acid or preferably with a derivative of the dibasic acid, such as an ester or an acid chloride. The proportions of the various reactants are so regulated as to have present in the final product approximately the same number of carboxy and hydroxyl radicals in order to achieve a substantially high molecular weight. An excess of either the dicarboxy compound or the glycol will serve to lower the molecular weight and thereby produce less desirable compounds.

The polyesters are blended with the acrylonitrile polymer by mixing the solid resins in any type of mixing apparatus, such as a Banbury mixer, a roll mill, or a dough mixer. The reactants may be heated to soften the solid resins and thereby promote a more ready mixing operation. Plasticizers or solvents may be added to expedite the mixing operation and avoid heating to temperatures at which the polyesters may decompose or otherwise deteriorate. Since the fiber forming acrylonitrile polymers are very difficultly soluble the preferred practice of this invention involves the use of compounds, such as N,N - dimethylformamide, α - cyanoacetamide, butyrol - lactone, and ethylene carbonate, which are known to be suitable solvents for the acrylonitrile polymers and which also are solvents for the polyesters.

Further details of this invention are set forth with respect to the following examples.

*Example 1*

A polyester was prepared by mixing approximately stoichiometric proportions of adipic acid and methyldiethanolamine and heating the mixture at 175° C. for 60 hours in a stream of dry nitrogen. A spinning solution was prepared by intimately mixing two parts by weight of the polyester with eighteen parts of a copolymer of 95 percent acrylonitrile and five percent vinyl acetate and 80 parts of dimethylacetamide. The mixture was stirred and warmed to a maximum of 60° C. until a homogeneous solution was obtained. Fibers were prepared by extruding the solution from a spinneret containing thirty apertures each 0.005 inch in diameter. The fiber was extruded into a mixture of approximately two parts of dimethylacetamide and one part of water, which extracted the ploymer solvent and precipitated the polymer as a continuous multifilament strand. The fiber was conditioned by stretching 350 percent.

The fiber prepared in accordance with the preceding paragraph and a fiber prepared from the copolymers of 95 percent acrylonitrile and five percent vinyl acetate, were each dyed by a standard dyeing technique, whereby 1 cc. of a two percent aqueous solution of an acid dyestuff, 5 ccs. of three percent sulfuric acid and 40 ccs. of water were used for each gram of fiber being dyed. The fiber prepared in accordance with this example absorbed 99 percent of the dye from the dye bath in 60 minutes at 100° C., whereas under the same conditions the unmodified copolymer absorbed only twelve percent of the dyestuff. The fiber of the modified polymer developed a bright red color, whereas the fiber of the unmodified polymer was an unsatisfactory pale color.

*Example 2*

The procedure of the preceding example was repeated, except that the polymer was modified by the incorporation of ten percent of a polyester made by reacting stoichiometric proportions of adipic acid and cyclohexyldiethanolamine. The fiber of the modified polymer absorbed 98 percent of the dye from the standard dye bath, whereas the fiber of the unmodified polymer took up a maximum of twelve percent under identical conditions.

*Example 3*

The procedure of Example 1 was repeated, except that the polymer was modified by the addition of ten percent of a polyester made by reacting stoichiometric proportions of 1,4 - butanediol and dimethylimino - β,β' - di - propionate. The modified polymer absorbed sufficient Wool Fast Scarlet dye to develop a deep red color. On the other hand the fiber of the unmodified polymer absorbed only a slight amount of dye and developed a pale pink coloration.

*Example 4*

Using the procedure described in Example 1, a polyester was prepared from two moles of methyl diethanolamine, one mole of dimethyl terephthalate and one mole of dimethyl adipate. The polyester so obtained was blended with nine parts by weight of a copolymer of 95 percent acrylonitrile and five percent vinyl acetate. The modified polymer absorbed 98 percent of the dye from the standard dye bath.

*Example 5*

A polyester was prepared from equimolar proportions of succinic acid and methyl diethanolamine, and blended to the extent of ten percent in a copolymer of 95 percent acrylonitrile and five percent vinyl acetate. Fibers prepared from the modified polymer were much more dye receptive than the unmodified polymer.

*Example 6*

A polyester was prepared by reacting equimolar proportions of dimethyl terephthalate and methyl diethanolamine. The polymer was dispersed in four parts of N,N-dimethylacetamide. Butyl bromide in an amount slightly in excess of the stoichiometric proportion was added and dispersed in the mixture. A homogeneous solution of the quaternary ammonium butyl bromide salt of the polyester was thereby obtained. Fibers prepared therefrom were dyed effectively by the procedure described in Example 1.

*Example 7*

A polyester was prepared by reacting the dimethyl ester of methylimino-β,β'-dipropionic acid and methyl diethanolamine. Non-dye receptive copolymers of 95 percent acrylonitrile and five percent vinyl acetate were made dyeable by blending nine parts of the copolymer with one part of the polyester.

*Example 8*

Other polyesters were prepared and blended with a non-dye receptive copolymer of 95 percent acrylonitrile and five percent vinyl acetate, and the blends were found to be capable of being dyed by conventional techniques with acid dyestuffs. The polyesters of maleic acid and methyl diethanolamine, when blended with the copolymer produced a polymer of greatly improved dyestuff affinity. Copolymers prepared from azelaic acid and methyl diethanolamine and the copolymers of azelaic acid and cyclohexyl diethanolamine were both found to form copolymer blends which absorbed 99 percent of the dye in the standard dye bath as described in the preceding experiments.

The invention is defined by the following claims.

1. A dyeable fiber-forming composition comprising a blend of 70 to 98 percent by weight of (A) a polymer of at least 75 percent by weight of acrylonitrile and not more than 25 percent of another polymerizable mono-olefinic monomer copolymerizable therewith, and from 2 to 30 percent of (B) a high molecular weight linear polyester formed by the reaction of equimolecular proportions of a glycol and a member of the group consisting of dicarboxylic acids and mixtures of dicarboxylic acids with mono-hydroxymonocarboxylic acids, at least one of said reactants containing a radical of the group consisting of tertiary amino groups having radicals attached thereto of the group consisting of alkyl, aralkyl, and cycloalkyl, and quaternary ammonium groups.

2. A dyeable fiber-forming composition as defined in claim 1 wherein (B) is an azelaic acid polyester of methyl diethanolamine.

3. A dyeable fiber-forming composition as defined in claim 1 wherein (B) is an azelaic acid polyester of cyclohexyl diethanolamine.

4. A dyeable fiber-forming composition as defined in claim 1 wherein (B) is an adipic acid polyester of methyl diethanolamine.

5. A dyeable fiber-forming composition as defined in claim 1 wherein (B) is an adipic acid polyester of cyclohexyl diethanolamine.

6. A dyeable fiber-forming composition as defined in claim 1 wherein (B) is a succinic acid polyester of methyl diethanolamine.

7. A dyeable fiber-forming composition comprising a blend of 70 to 98 percent by weight of (A) a copolymer of 75 to 98 percent by weight of acrylonitrile and from 2 to 25 percent of another polymerizable mono-olefinic monomer copolymerizable therewith, and from 2 to 30 percent of (B) a high molecular weight linear polyester formed by the reaction of equimolecular proportions of a glycol and a member of the group consisting of dicarboxylic acids and mixtures of dicarboxylic acids with mono-hydroxymonocarboxylic acids, at least one of said reactants containing a radical of the group consisting of tertiary amino groups having radicals attached thereto of the group consisting of alkyl, aralkyl, and cycloalkyl, and quaternary ammonium groups.

References Cited in the file of this patent

UNITED STATES PATENTS

| | | |
|---|---|---|
| 2,314,972 | Dreyfus | Mar. 30, 1943 |
| 2,356,079 | Nelles et al. | Aug. 15, 1944 |
| 2,394,010 | Quarles | Feb. 5, 1946 |
| 2,404,714 | Latham | July 23, 1946 |
| 2,417,513 | Nelles et al. | Mar. 18, 1947 |

FOREIGN PATENTS

| | | |
|---|---|---|
| 502,861 | Great Britain | Mar. 22, 1939 |
| 613,817 | Great Britain | Dec. 3, 1948 |